United States Patent [19]
Arimilli et al.

[11] Patent Number: 6,065,086
[45] Date of Patent: May 16, 2000

[54] DEMAND BASED SYNC BUS OPERATION

[75] Inventors: Ravi Kumar Arimilli, Austin; John Steven Dodson, Pflugerville; Derek Edward Williams, Austin; Jerry Don Lewis, Round Rock, all of Tex.

[73] Assignee: International Business Machines Corporation, Armonk, N.Y.

[21] Appl. No.: 09/024,615

[22] Filed: Feb. 17, 1998

[51] Int. Cl.[7] ............................... G06F 9/52; G06F 13/38
[52] U.S. Cl. ............................ 710/129; 712/220
[58] Field of Search ................................ 709/100, 400, 709/300, 248, 106; 710/1, 61, 129, 52; 712/200, 203, 217, 214, 220; 713/400; 711/141

[56] References Cited

U.S. PATENT DOCUMENTS

| | | | |
|---|---|---|---|
| 4,636,948 | 1/1987 | Gdaniec et al. | 709/106 |
| 5,075,840 | 12/1991 | Grohoski et al. | 712/23 |
| 5,276,828 | 1/1994 | Dion | 709/248 |
| 5,452,443 | 9/1995 | Oyamada et al. | 714/10 |
| 5,617,553 | 4/1997 | Minagawa et al. | 711/206 |
| 5,664,214 | 9/1997 | Taylor et al. | 712/20 |
| 5,737,759 | 4/1998 | Merchant | 711/146 |
| 5,881,264 | 3/1999 | Kurosawa | 712/217 |

*Primary Examiner*—Gopal C. Ray
*Attorney, Agent, or Firm*—Volel Emile; Daniel E. Venglarik; Andrew J. Dillon

[57] ABSTRACT

A register associated with the architected logic queue of a memory-coherent device within a multiprocessor system contains a flag set whenever an architected operation enters the initiating device's architected logic queue to be issued on the system bus. The flag remains set even after the architected logic queue is drained, and is reset only when a synchronization instruction is received from a local processor, providing historical information regarding architected operations which may be pending in other devices. This historical information is utilized to determine whether a synchronization operation should be presented on the system bus, allowing unnecessary synchronization operations to be filtered. When a local processor issues a synchronization instruction to the device managing the architected logic queue, the instruction is generally accepted when the architected logic queue is empty. Otherwise the architected operation is retried back to the local processor until the architected logic queue becomes empty. If the flag is set when the synchronization instruction is accepted from the local processor, it is presented on the system bus. If the flag is not set when the synchronization instruction is received from the local processor, the synchronization operation is unnecessary and is not presented on the system bus.

20 Claims, 3 Drawing Sheets

DEMAND BASED SYNC BUS OPERATION

BACKGROUND OF THE INVENTION

1. Technical Field

The present invention relates in general to synchronization of processing in multiprocessor systems and in particular to presentation of synchronization bus operations on a multiprocessor system bus. Still more particularly, the present invention relates to selective synchronization by filtering out unnecessary synchronization bus operations prior to presentation on the system bus based on historical instruction execution information.

2. Description of the Related Art

Programmers writing software for execution on multiprocessor data processing systems often need or desire to provide points within the flow of instruction execution serving as processing boundaries, ensuring that all instructions within a first code segment are fully executed before any instructions within a subsequent code segment are executed. This is particularly true when the multiprocessor system includes superscalar processors supporting out-of-order instruction execution and weak memory consistency. The instructions sets supported by most popular commercial processors includes an instruction for setting such a processing boundary. In the PowerPC™ family of processors, for example, the instruction which may be employed by a programmer to establish a processing boundary is the "sync" instruction. The sync instruction orders the effects of instruction execution. All instructions initiated prior to the sync instruction appear to have completed before the sync instruction completes, and no subsequent instructions appear to be initiated until the sync instruction completes. Thus, the sync instruction creates a boundary having two significant effects: First, instructions which follow the sync instruction within the instruction stream will not be executed until all instructions which precede the sync instruction in the instruction stream have completed. Second, instructions following a sync instruction within the instruction stream will not be reordered for out-of-order execution with instructions preceding the sync instruction.

In the PowerPC™ family of devices, an architected logic queue is employed to hold "architected" instructions which have been issued by a corresponding processor but which have not been executed. As used herein, architected instructions are those instructions which might affect the storage hierarchy as perceived by other devices (other processors, caches, and the like) within the system. These include essentially any instruction which affect the storage hierarchy except load/stores to cacheable memory space. Examples for the PowerPC™ family of devices include: tlbi (translation lookaside buffer invalidate); tlbsync (translation lookaside buffer synchronize); dcbf (data cache block flush); dcbst (data cache block store); icbi (instruction cache block invalidate); and load/stores to noncacheable memory space (e.g., memory mapped devices).

The synchronization instruction affects or is affected by both cacheable operations (normal loads and stores) and architected operations. A processor which has issued a cacheable operation which is pending will not issue a synchronization instruction until pending cacheable operations are complete, which the processor may ascertain from the return of appropriate data. The processor essentially stalls the synchronization instruction until any pending cacheable operations are complete.

Architected operations received from a local processor may be queued in the architected logic queue until necessary resources become available for performing the architected operation. When a sync instruction is received while the architected logic queue is not empty, the sync instruction is retried until the queue is drained. Once the local architected logic queue is drained, the sync instruction is presented on the system bus for the benefit of other devices which may not have completed their operations. Thus, in current architectures, sync instructions always get presented on the system bus. The sync operation is always made visible on the system bus because the initiator device receiving the sync instruction from a local processor has no historical information regarding its own past operations to determine whether it initiated an architected operation, and no information regarding the status of architected operations within devices snooping such architected operations from the system bus. Such snooping devices may, upon receipt of an architected logic operation, return an indication that the architected operation is complete when the operation was actually queued (posted). Moreover, architected operations generally do not return data, but comprise "address-only" operations. The initiator device thus lacks any basis for filtering out unnecessary sync operations since, even if the initiator device's own architected queue is drained when the sync instruction is received from a local processor, the initiator device has no means for determining whether other devices in the memory hierarchy have a snooped architected operation pending. Therefore, despite the fact that the architected queue remains relatively empty most of the time (since architected operations occur relatively infrequently), many sync operations are seen on the system bus. Under current architectures, as many as one in every 100 system bus cycles may be consumed by a sync-type operation.

The need to filter unnecessary sync operations is significant because sync instructions do not scale with technology. As technology progresses, particularly device sizes, many aspects of data processing system performance scale. For example, the number of execution units within a processor may increase to allow more instructions to be executed in parallel. Larger caches may be implemented, resulting in more cache hits and fewer misses. Sync operations, on the other hand, do not scale; instead the penalty associated with sync operations worsens as technology progresses. Even if sync instructions remain a fixed percentage of all runtime instructions, because more instructions are being executed in parallel, the sync instructions consume a larger portion of available processor cycles and bandwidth. Furthermore, as memory hierarchies—all levels of which are affected by a sync instruction—become deeper, the performance penalty associated with a single sync instruction increases.

It would be desirable, therefore, to provide a mechanism for filtering unnecessary synchronization operations from presentation on a multiprocessor system bus. It would further be advantageous if the mechanism permitted selective synchronization based on types of instructions and/or operations historically executed by the device receiving the synchronization instruction.

SUMMARY OF THE INVENTION

It is therefore one object of the present invention to provide an improved method and apparatus for synchronization of processing in multiprocessor systems.

It is another object of the present invention to provide a method and apparatus for selective presentation of synchronization bus operations on a multiprocessor system bus.

It is yet another object of the present invention to provide a method and apparatus for selective synchronization by filtering out unnecessary synchronization bus operations prior to presentation on the system bus based on historical instruction execution information.

The foregoing objects are achieved as is now described. A register associated with the architected logic queue of a memory-coherent device within a multiprocessor system contains a flag set whenever an architected operation—one which might affect the storage hierarchy as perceived by other devices within the system—enters the initiating device's architected logic queue to be issued on the system bus. The flag remains set even after the architected logic queue is drained, and is reset only when a synchronization instruction (such as the "sync" instruction supported by the PowerPC™ family of devices) is received from a local processor. The state of the flag thus provides historical information regarding architected operations which may be pending in other devices within the system after being snooped from the system bus. This historical information is utilized to determine whether a synchronization operation should be presented on the system bus, allowing unnecessary synchronization operations to be filtered and additional system bus cycles made available for other purposes. When a local processor issues a synchronization instruction to the device managing the architected logic queue, the instruction is generally accepted when the architected logic queue is empty. Otherwise the architected operation is retried back to the local processor until the architected logic queue becomes empty. If the flag is set when the synchronization instruction is accepted from the local processor, it is presented on the system bus. If the flag is not set when the synchronization instruction is received from the local processor, the synchronization operation is unnecessary and is not presented on the system bus.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
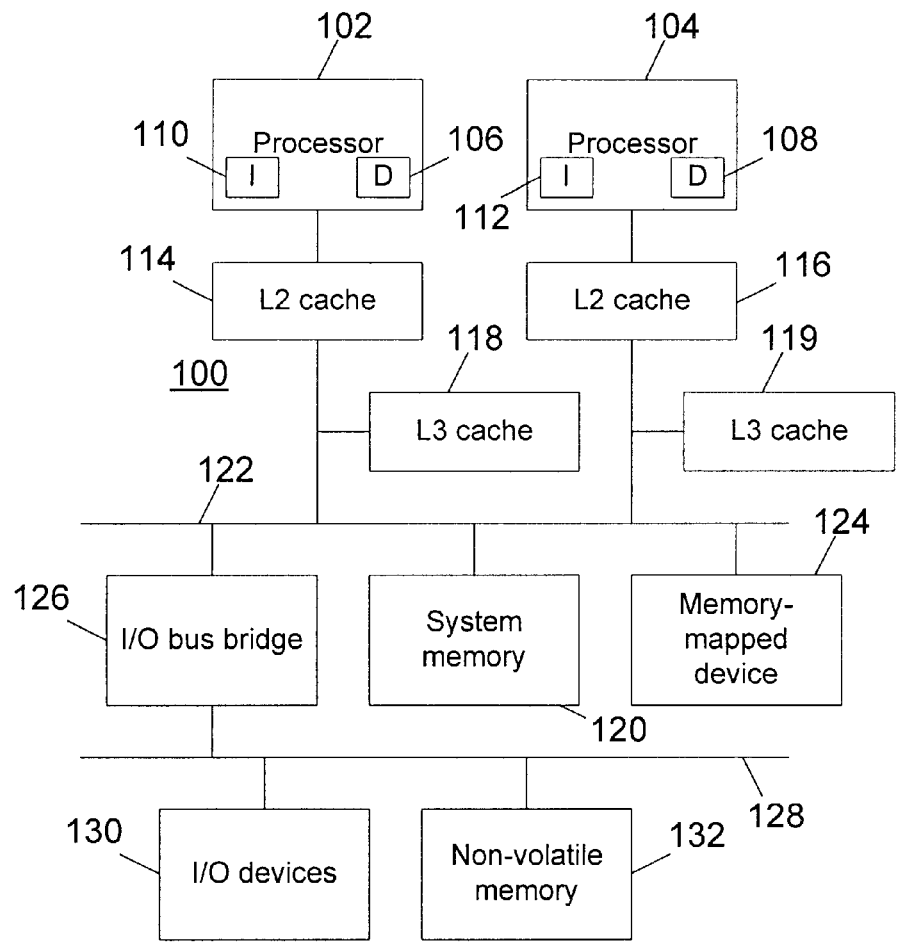
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102 and 104, which preferably comprise one of the PowerPC™ family of processors available from International Business Machines of Armonk, N.Y. Although only two processors are depicted in the exemplary embodiment, those skilled in the art will appreciate that additional processors may be utilized in a multiprocessor data processing system in accordance with the present invention.

Each processor 102 and 104 includes a level one (L1) data cache 106 and 108, respectively, and an L1 instruction cache 110 and 112, respectively. Although illustrated as bifurcated instruction and data caches in the exemplary embodiment, those skilled in the art will recognize that a single, unified L1 cache may be implemented. In order to minimize data access latency, one or more additional levels of cache memory may be implemented within data processing system 100, such as level two (L2) caches 114 and 116 and level three (L3) caches 118 and 119. The lower cache levels—L2 and L3—are employed to stage data to the L1 caches and typically have progressively larger storage capacities but longer access latencies. For example, data caches 106 and 108 and instruction caches 110 and 112 may each have a storage capacity of 32 KB and an access latency of approximately 1–2 processor cycles. L2 caches 114 and 116 might have a storage capacity of 512 KB but an access latency of 5 processor cycles, while L3 caches 118 and 119 may have a storage capacity of 4 MB but an access latency of greater than 15 processor cycles. L2 caches 114 and 116 and L3 caches 118 and 119 thus serve as intermediate storage between processors 102 and 104 and system memory 120, which typically has a much larger storage capacity but may have an access latency of greater than 50 processor cycles.

Both the number of levels in the cache hierarchy and the cache hierarchy configuration employed in data processing system 100 may vary. L2 caches 114 and 116 in the example shown are dedicated caches connected between their respective processors 102 and 104 and system memory 120 (via system bus 122). L3 caches 118 and 119 are depicted as lookaside caches logically vertical with L2 caches 114 and 116. As a result, data or instructions may be looked up in one of L2 caches 114 or 116 and one of L3 caches 118 and 119 simultaneously, although the data or instructions will only be retrieved from L3 cache 118 or 119 if the respective L2 cache 114 or 116 misses while L3 cache 118 or 119 hits. Those skilled in the art will recognize that various permutations of levels and configurations depicted may be implemented.

L2 caches 114 and 116 and L3 caches 118 and 119 are connected to system memory 120 via system bus 122. Also connected to system bus 122 may be a memory mapped device 124, such as a graphics adapter providing a connection for a display (not shown), and input/output (I/O) bus bridge 126. I/O bus bridge 126 couples system bus 122 to I/O bus 128, which may provide connections for I/O devices 130 and nonvolatile memory 132. System bus 122, I/O bus bridge 126, and I/O bus 128 thus form an interconnect coupling the attached devices, for which alternative implementations are known in the art. I/O devices 130 comprise conventional peripheral devices including a keyboard, a graphical pointing device such as a mouse or trackball, a display, and a printer, which are interfaced to I/O bus 128 via conventional adapters. Non-volatile memory 132 may comprise a hard disk drive and stores an operating system and other software controlling operation of system 100, which are loaded into volatile system memory 120 in response to system 100 being powered on. Those skilled in the art will recognize that data processing system 100 may include many additional components not shown in FIG. 1, such as serial and parallel ports, connections to networks or attached devices, a memory controller regulating access to system memory 120, etc. Such modifications and variations are within the spirit and scope of the present invention.

A typical communications transaction on system bus 122 includes a source tag indicating a source of the transaction, an address and/or data. Each device connected to system bus 122 preferably snoops all communication transactions on system bus 122, intervening in communications transactions intended for other recipients when necessary and reproducing changes to system memory data duplicated within the device when feasible and appropriate. In accordance with the present invention, at least the lower level caches within data processing system 100 should preferably always be memory coherent, or else synchronization operations may need to be presented on the system bus in order to allow other caches the opportunity to complete operations.

Figure 2:
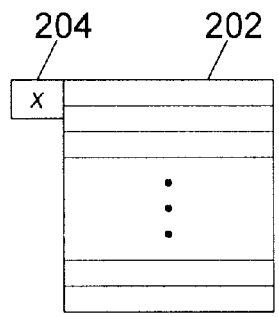
FIG. 2 is a diagram of an architected logic queue in accordance with a preferred embodiment of the present invention.

Referring to FIG. 2, a diagram of an architected logic queue in accordance with a preferred embodiment of the present invention is illustrated. Architected logic queue 200 is implemented, for example, within L2 cache 114 or 116 depicted in FIG. 1. Architected logic queue 200 includes a queue structure 202, which may be a conventional first-in, first-out (FIFO) queue, in which architected instructions are placed. As noted above, architected instructions are instructions which affect the memory storage hierarchy including essentially any memory-related instruction except loads/stores to cacheable memory space. For the PowerPC™ family of devices, architected instructions include tlbi, tlbsync, dcbf (flush), dcbst (clear), icbi, and loads/stores to noncacheable memory space (cache-inhibited loads and stores). Architected operations are bus operations initiated by a device in response to receipt of architected instructions.

Architected logic queue 200 also includes a register 204 containing a flag x. Flag x provides historical information regarding architected instructions which would require presentation of an ensuing synchronization operation on the system bus. Flag x is reset during system power-on/reset (POR). Thereafter, flag x is set whenever an architected operation enters queue 202 (whenever the local processor issues an instruction which would require an ensuing synchronization operations be presented on the system bus) and reset when a synchronization instruction is received from the local processor. Subsequent instructions received from a local processor are retried by the device until the synchronization operation is complete. In an alternative embodiment, flag x is instead set whenever a snooping device issues a response code indicating that an architected operation initiated by the device containing queue 202 was posted in a snoop queue within the snooping device, and reset when a synchronization instruction is received from the local processor. Setting and/or resetting flag x requires only at most one bit associated with architected and synchronization instructions. Thus, in the PowerPC™ family of devices, flag x may be changed based on recognition of an instruction code or from recognized patterns of the write-through/write-back (W), cache-inhibited (I), and memory coherency (M) attributes, more commonly referred to as the "WIM bits," or based on a response code received after initiating an architected operation. The state changes for flag x are summarized below in Table I.

TABLE I

| Flag state | Cause |
| --- | --- |
| x ← 0 | POR |
| x ← 1 | Architected operation enters queue -or- Snooping device indicates architected operation was posted |
| x ← 0 | Synchronization instruction received |

The state of flag x controls presentation of synchronization operations on the system bus. If a synchronization instruction is received while flag x is set, the synchronization operation is presented on the system bus, since architected logic queue 200 will be empty at the time the synchronization instruction is received. Devices connected to the system bus are preferably memory coherent, so that the synchronization instruction from the local processor need not be presented on the system bus to insure completion of cacheable loads and stores. However, flag x provides historical information regarding architected operations and, when set, indicates that an architected operation was queued since the last synchronization instruction was received. Snooped from the system bus by other devices in the system hierarchy, the architected operation may be pending in such other devices. The synchronization operation must be presented on the system bus to allow such potentially pending operations to complete prior to executing subsequent instructions.

If a synchronization instruction is received while flag x is not set, the synchronization operation is not presented on the system bus. The state of flag x=0 indicates that no architected operations were queued (in either a local architected logic queue or a remote snoop queue, depending upon the implementation) since the last synchronization instruction was received. Thus, any architected operations pending in other devices in the system hierarchy did not originate from the processor issuing the synchronization instruction. The synchronization instruction has no effect on instruction streams issued by remote processors. Therefore, the synchronization operation need not be presented on the system bus, but may be effectively ignored. The dependent relationship of synchronization operation presentation on the system bus to the state of flag x is summarized below in Table II.

TABLE II

| Flag state | Synchronization operation |
| --- | --- |
| x = 0 | Not presented on system bus |
| x = 1 | Presented on system bus |

Flag x, set by entry of an architected operation into the architected logic queue of a local device or the snoop queue of a remote device, remains set even after the triggering architected operation is completed. Flag x is not reset until the next synchronization instruction is received. Flag x thus indicates that an architected operation has been issued and/or posted since the last synchronization operation. However, flag x affects only the circumstances under which a synchronization operation is presented on the system bus. While every synchronization instruction in prior art architectures resulted in a synchronization operation being presented on the system bus, this is not the case for the present invention, as described above. The effect of a synchronization operation presented on the system bus, on the other hand, is not affected by the state of flag x. A remote device in the system hierarchy, detecting a synchronization operation on the system bus through its snoop logic, determines whether any architected operations originating from the same processor issuing the synchronization instruction are pending in its snoop queues and, if so, retrys the synchronization operation. Thus, the present invention does not alter the consequence of presenting a synchronization operation on the system bus, but merely interjects criteria for determining whether to present the synchronization operation on the system bus, allowing unnecessary synchronization operations to be filtered.

Figure 3:
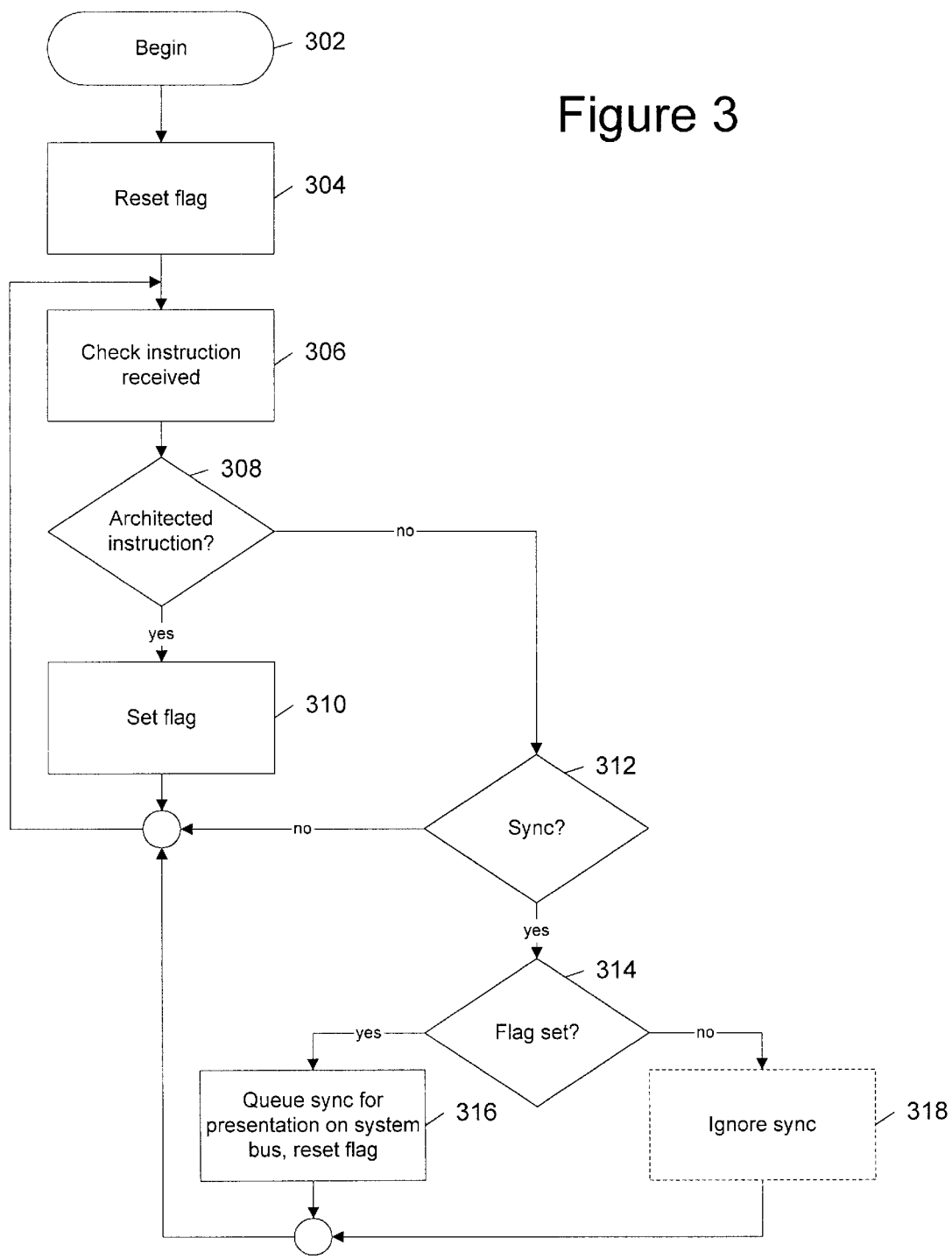
FIG. 3 depicts a high level flowchart for a process of managing an architected logic queue in accordance with a preferred embodiment of the present invention.

With reference now to FIG. 3, a high level flowchart for a process of managing an architected logic queue in accordance with a preferred embodiment of the present invention is depicted. The process may be executed within a device maintaining an architected logic queue of the type illustrated in FIG. 2, such as L2 caches 114 and 116 depicted in FIG. 1. The process begins at step 302, which may correspond to power on/reset of the system, and then passes to step 304, which illustrates resetting the flag maintained in the architected logic queue register and indicating whether an architected operation was enqueued since the last synchronization operation (i.e., flag x). The process then passes to step 306 which depicts checking an instruction received by the device, and then to step 308, which illustrates a determination of whether the instruction is an architected instruction. If so, the process proceeds to step 310, which depicts setting the flag described above and enqueuing the architected operation. The process then returns back to step 306 to check the next instruction received by the device.

If an instruction received by the device is not an architected instruction, the process proceeds instead to step 312 which illustrates a determination of whether the instruction received is a synchronization (sync) instruction. If not, the process returns to step 306 to check the next instruction as described above. If so, however, the process proceeds to step 314, which depicts a determination of whether the flag is presently set. If the flag is set, the process proceeds to step 316, which illustrates queuing the synchronization operation for presentation in turn on the system bus and resetting the flag. No subsequent instructions are accepted until the synchronization operation is complete.

Referring again to step 316, the synchronization operation is enqueued for presentation on the system bus. Once the synchronization operation is presented on the system bus and completed, the process returns to step 306 to check the next instruction received.

Referring again to step 314, if the flag is not set at the time a synchronization instruction is received, the process returns instead to step 306 to check the next instruction received. The effect is depicted in "step" 318, which illustrates effectively ignoring the synchronization instruction. The process loop depicted in steps 306 through 318 is continued for instructions received from a local processor until the process is killed, such as by the system being powered off.

Figure 4:
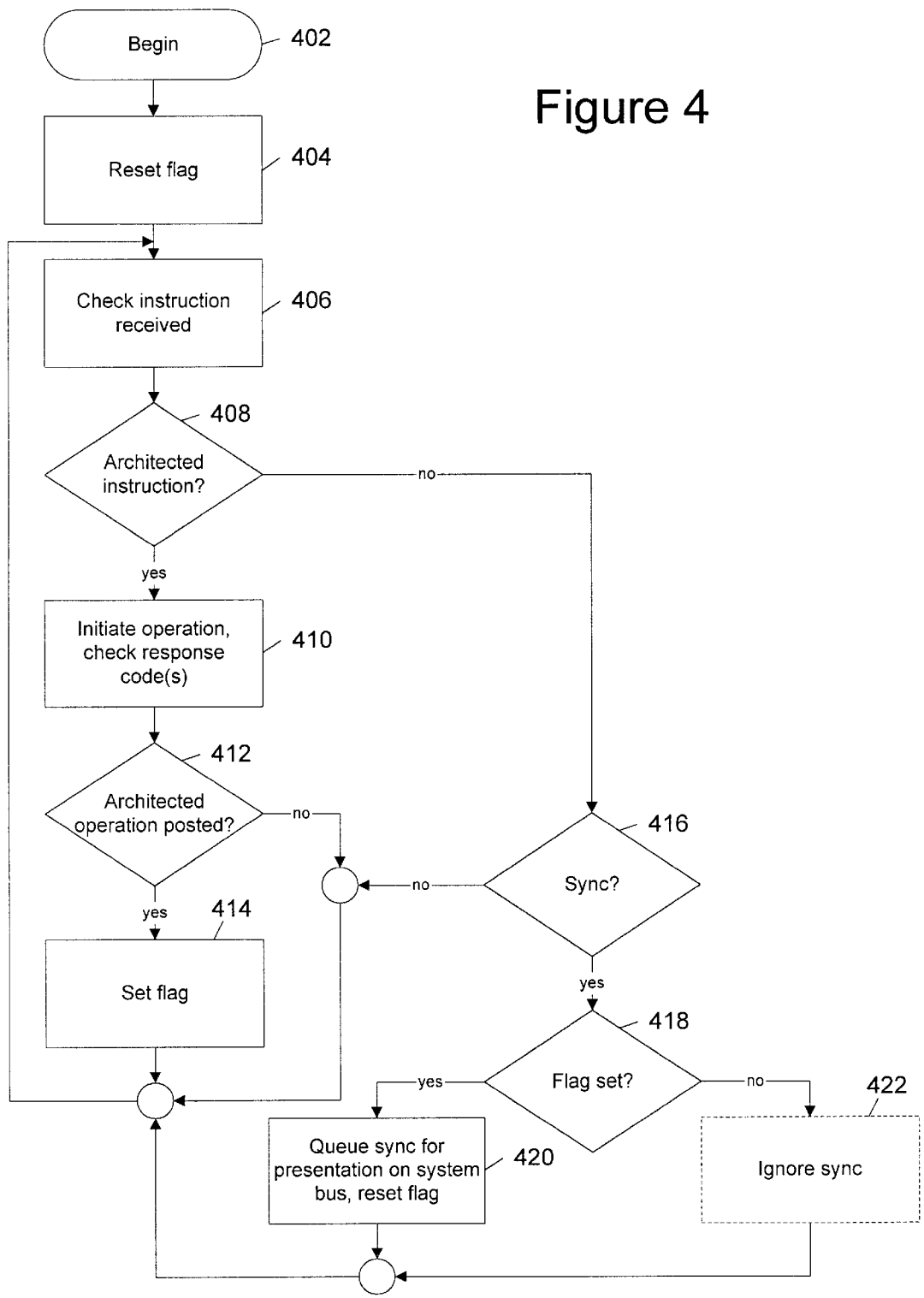
FIG. 4 is a high level flowchart for an alternative process of managing an architected logic queue in accordance with a preferred embodiment of the present invention.

Referring to FIG. 4, a high level flowchart for an alternative process of managing an architected logic queue in accordance with a preferred embodiment of the present invention is illustrated. In this embodiment, more precise historical information is reflected by flag x and is employed to determine whether to present a synchronization operation on the system bus. As described earlier, a synchronization instruction will not be issued by a processor unless all previous cacheable operations are complete. A synchronization operation will be retried to the local processor if the local architected logic queue is not empty. Therefore, when a synchronization operation is accepted by a device from a local processor under these circumstances, the only risk in ignoring the synchronization operation is that an architected operation previously initiated by the device may be pending in the snoop queue of a remote, snooping device.

As noted earlier, architected operations occur infrequently and typically do not provide the initiator device with an intrinsic mechanism for determining when the operation is complete, as do cacheable operations by virtue of data being returned. Additionally, upon snooping an architected operation from the system bus, a snooping device may return a response code indicating that the operation is complete when the operation is actually being posted in a snoop queue. Therefore, the principle risk in ignoring a synchronization instruction issued by a local processor and accepted by a device is that an architected operation originated by the same processor originating the synchronization instruction may still be pending in a remote snooping device. In the alternative embodiment presently being described, this risk is negated by having snooping devices return a response code to architected operations indicating that the operation is being posted.

The process begins at step 402, which again may correspond to power on/reset of the system, and then passes to step 404, which illustrates resetting the flag maintained in the architected logic queue register indicating whether an architected operation was posted in a remote snoop queue since the last synchronization operation (i.e., flag x). The process then passes to step 406 which depicts checking an instruction received by the device, and then to step 408, which illustrates a determination of whether the instruction is an architected instruction. If so, the process proceeds to step 410, which depicts initiating the operation on the system bus and checking any response code or codes received. The process then passes to step 412, which depicts a determination of whether the architected operation was posted in a remote snoop queue from the response code(s) received. Snooping devices may retry the architected operation, or accept the operation with a response code indicating whether the operation was posted or not posted. If the operation was not posted in a remote snoop queue, the process then returns back to step 406 to examine the next instruction received by the device.

Referring again to step 412, if an architected operation initiated by the device is posted in the snoop queue of a remote device, the process proceeds instead to step 414, which illustrates setting the flag indicating that an architected operation is being remotely posted, and then passes back to step 406 to check the next instruction received.

Referring once again to step 408, if the instruction received by the device is not an architected instruction, the process proceeds instead to step 416, which illustrates a determination of whether the instruction received is a synchronization (sync) instruction. If not, the process returns to step 406 to check the next instruction as described above. If so, however, the process proceeds to step 418, which depicts a determination of whether the flag is presently set. If the flag is set, the process proceeds to step 420, which illustrates queuing the synchronization operation for presentation in turn on the system bus and resetting the flag. Once the synchronization operation is enqueued for presentation on the system bus, the process returns to step 406 to check the next instruction received.

Referring again to step 418, if the flag is not set at the time a synchronization instruction is received, the process returns instead to step 406 to check the next instruction received.

The effect of ignoring the synchronization instruction is again depicted in "step" 422.

The present invention provides a means for maintaining historical information regarding architected operations which would require presentation of a synchronization operation on the system bus. This information is used to filter out unnecessary synchronization operations, preventing such unnecessary operations from reaching the system bus. In contrast with the prior art, not all synchronization instructions result in synchronization operations being presented on the system bus. In a first embodiment, presentation of synchronization operations on the system bus occurs only when architected operations, including loads and stores to noncacheable memory, were enqueued in the architected logic queue since the last synchronization operation. In an alternative embodiment, presentation of synchronization operations on the system bus occurs only when architected operations were posted in a remote snooping device since the last synchronization operation. In either embodiment, architected operations may still be pending in other devices in the system hierarchy which snooped the architected operations from the system bus. If the snoop queue of a device which snoops a synchronization operation from the system bus contains architected operations originating from the same processor as originated the synchronization operation, the synchronization operation is retried in accordance with conventional art.

By filtering other synchronization operations in accordance with the present invention, the periodicity of synchronization operations on the system bus may be reduced to as low as one in 10,000 system bus cycles. Moreover, within a device managing an architected logic queue in accordance with the present invention, synchronization instructions are not seen by the cache controller, only by the architected logic. Thus the cache controller logic is also freed for other purposes.

While the invention has been particularly shown and described with reference to a preferred embodiment, it will be understood by those skilled in the art that various changes in form and detail may be made therein without departing from the spirit and scope of the invention.

What is claimed is:

1. A method of facilitating instruction synchronization in a multiprocessor system, comprising:

receiving operations from a local processor;

queuing operations received from the local processor within a queue for presentation on a system bus within the system;

responsive to receiving an operation from the local processor which may affect data storage in other devices within the system, setting a flag associated with the queue indicating that the operation was received; and responsive to receiving a synchronization instruction from the local processor, checking a state of the flag before handling the synchronization instruction.

2. The method of claim 1, further comprising:

responsive to determining that the flag is set, presenting a synchronization operation corresponding to the synchronization instruction on the system bus.

3. The method of claim 1, further comprising:

responsive to determining that the flag is not set, ignoring the synchronization instruction.

4. The method of claim 1, further comprising:

responsive to receiving a synchronization instruction from the local processor while the flag is set, resetting the flag.

5. The method of claim 1, further comprising:

after setting the flag, maintaining the flag in a set state regardless of whether the queue contains operations which may affect storage in other devices.

6. A method of handling synchronization operations in a multiprocessor system, comprising:

receiving an instruction from a local processor;

determining whether the received instruction is an architected instruction prompting a system bus operation which may affect data storage in other devices within the system; and responsive to determining that the received instruction is an architected instruction, setting a flag associated with a queue from which system bus operations prompted by instructions received from the local processor are issued, the flag indicating whether an architected instruction has been received from the local processor since a synchronization instruction was last received from the local processor.

7. The method of claim 6, further comprising:

responsive to determining that the received instruction is not an architected instruction, determining whether the instruction is a synchronization instruction.

8. The method of claim 7, further comprising:

responsive to determining that the received instruction is a synchronization instruction, determining whether the flag is set.

9. The method of claim 8, further comprising:

responsive to determining that the flag is set when the synchronization instruction is received, queuing a synchronization operation for presentation on the system bus and resetting the flag.

10. The method of claim 8, further comprising:

responsive to determining that the flag is not set when the synchronization instruction is received, ignoring the synchronization instruction.

11. The method of claim 8, further comprising:

responsive to receiving an architected instruction from the local processor after a synchronization instruction was received while the flag was set, retrying the architected instruction until a synchronization operation corresponding to the synchronization instruction is complete.

12. The method of claim 8, further comprising:

responsive to determining that the flag is set when the synchronization instruction is received, queuing a synchronization operation for presentation on the system bus and resetting the flag; and responsive to detecting an architected operation in a snoop queue originating from the processor originating the synchronization operation, retrying the synchronization operation.

13. The method of claim 8, further comprising:

responsive to detecting a synchronization operation on the system bus while a snoop queue contains at least one architected operation which is not complete and which originated from a processor originating the synchronization operation, retrying the synchronization operation.

14. A data processing system, comprising:

a plurality of processors connected to a system bus;

a queue containing operations for presentation on the system bus; and a flag associated with the queue and having a first state indicating that an architected instruction was received by the queue from a local processor since a synchronization instruction was last received by the queue from the local processor, wherein the queue checks a state of the flat before handling a synchronization instruction received by the queue from the local processor.

15. The data processing system of claim 14, wherein the flag has a second state indicating that no architected instruction was received by the queue from the local processor since a synchronization instruction was last received by the queue from the local processor.

16. The data processing system of claim 15, wherein the flag transitions from the first state to the second state when an architected instruction is received by the queue from the local processor while the flag is in the first state.

17. The data processing system of claim 15, wherein the flag transitions from the second state to the first state when a synchronization instruction is received by the queue from the local processor while the flag is in the second state.

18. The data processing system of claim 15, further comprising:

logic queuing a synchronization operation in the queue when a synchronization instruction is received from the local processor while the flag is in the second state.

19. The data processing system of claim 15, further comprising:

logic no-oping a synchronization instruction received from the local processor while the flag is in the first state.

20. The data processing system of claim 15, further comprising:

logic retrying a synchronization operation detected on the system bus while an architected operation in a snoop queue is not completed when the incomplete architected operation originated from a processor originating the synchronization operation.

* * * * *